Patented Feb. 12, 1935

1,991,242

UNITED STATES PATENT OFFICE 1,991,242

DISPOSAL OF INDUSTRIAL WASTES

Gordon Manley Cole and Howard W. Hall, Corona, Calif., assignors to California Fruit Growers Exchange, Los Angeles, Calif., a corporation of California No Drawing. Application August 15, 1930, Serial No. 475,620

23 Claims. (Cl. 99—11)

This invention relates to the disposal of industrial wastes, and has particular reference to the treatment of those materials which contain in suspension, colloidal dispersion, or solution, substances which are coagulable by a change in their chemical environment.

At various points in industrial processes, difficulties are encountered due to properties of the material being handled or treated, which are imparted thereto by the presence of certain substances. Previously, materials of this nature have been discarded or rendered useful with a great deal of difficulty. Frequently such materials or substances can be coagulated and the difficulties caused by the presence of such substances can be eliminated by a change in their chemical environment.

Among the substances whose presence in materials being handled in industrial processes frequently gives rise to difficulties of various sorts may be mentioned pectous substances.

This invention has especial reference to the treatment of materials containing pectous substances and the elimination wholly or in part of the difficulties caused by their presence. The chief causes of difficulty in handling more or less fluid materials containing pectous substances arise from properties imparted to the material by the pectous substances, such as high viscosity, a strong tendency to retain moisture, etc. As an example of material in which these and other difficulties emanating from the same or similar causes may be encountered may be mentioned the pulp or other material resulting from the processing of fruits, vegetables, and other things high in pectous substance content. Among materials high in pectous substance content which are handled in manufacturing processes are apples, citrus fruits, and sugar beets. Other materials are, of course, handled but these are typical examples.

In citrus fruit processing, for example, a pulpy material may result which is very difficult to handle satisfactorily. This difficulty may apparently be due to the presence of pectous substances which, among other things, cause the pulp to retain water very tenaciously, making it very difficult to press, or dry, or otherwise dehydrate.

Furthermore, the pulpy residue can not be dried without the expenditure of a prohibitive amount of money and the development of odors which are highly objectionable.

We have now discovered that it is possible, by changing the chemical environment of the pectous substances by means of appropriate reagents or by means of appropriate organic ferments, or enzymes, or both, to coagulate or alter the pectous substances and thus largely eliminate the difficulties to which they give rise. Accordingly it is an object of our invention to expedite the handling of materials by eliminating the undesirable effects of coagulable substances contained in the materials.

Where the substances to be coagulated are pectous substances, this may be achieved, or materially assisted by the addition of appropriate reagents. It may also be achieved or assisted by the addition of suitable enzymes or enzymic material. Thus a given enzyme or enzymic material may be most effective in coagulating the pectous or other substances at a certain predetermined optimum acidity, which may be brought about in the material by the use of the necessary or suitable reagents. The enzymes capable of coagulating the slimy constituents of citrus and other waste materials, in the manner described, we designate as a group by the term "pectases". By the term "a pectase", as used in the claims, we mean an enzyme from that group. In the case of the employment of enzymes or enzymic materials which affect pectous substances, the enzyme may function most efficiently in the presence of certain materials; for example, the enzyme known as pectase, which coagulates pectous substances, or converts pectin to pectic acid, seems to effect coagulation most advantageously in the presence of an alkaline earth or magnesium compound, or in the presence of a heavy metal compound. Thus, for example, if it be desired to lower the acidity of the material and to add an alkaline earth, both these purposes could be accomplished at once by the addition of the desired amount of calcium hydroxide, or lime.

If enzymic material is to be employed, it may be obtained from any suitable biological or vegetable source. We have found that leguminous plants in general, and particularly clover and alfalfa are suitable and convenient sources of enzymes which are able, under proper conditions, to coagulate pectous substances. The enzyme may be added in any suitable form, as a dry preparation, as a liquid infusion, or the material containing the enzyme may be added directly, such as, for example, alfalfa meal.

Accordingly it is an object of our invention to provide a process by which materials containing pectous substances may be treated so as to be more readily handled.

A further object of our invention is to provide a process by which industrial wastes containing pectous substances may be made more readily disposable.

A further object is to provide a process by which waste fruit and vegetable materials may be made more readily disposable by the coagulation of the pectous substances.

Still another object is to provide a process in which the pectous substances in waste products may be coagulated by enzymic action.

A still further object is to provide a process by which waste products containing pectous substances may be more easily handled, dehydrated, and otherwise treated due to coagulation of the pectous substances by pectase.

A further object is to provide a process by means of which citrus waste materials may be readily converted into valuable products.

Another object is to provide a process of utilizing citrus waste materials by converting the same into by-products by treating the waste material with alfalfa.

Another object is to provide a new and useful product, either dried or undried, composed essentially of the solids of waste citrus pulp and of alfalfa meal, either containing, or not, small amounts of salts of calcium or other metals.

Still other objects and advantages will be in part obvious and will in part appear from a contemplation of the invention as set forth hereinafter and in the appended claims.

Since our invention has been developed more particularly with relation to citrus fruit materials, it will be described in its specific aspects in connection therewith.

Ordinarily in the handling of citrus fruits the fruit is treated to extract the juice from the interior portion and the essential oils from the exterior part. All or a portion of the juice may be utilized as such, or treated to recover constituents thereof, or discarded; and all or a portion of the peel and pulp may be treated to recover unexpressed oils and/or pectin and/or other materials, or discarded. The resultant waste product is a mass of pulpy material which is composed largely of the fibrous matter of the peel and pulp, of residual juice and other constituents, and of considerable quantities of water which are added at various steps in the processing.

This pulp is mushy and somewhat viscous in character and may contain as high as or higher than 95% water. Under previous practices it has been fit for little else than to be discarded. Even the discarding has been difficult, disagreeable and expensive. Repeated attempts have shown that it will not handle satisfactorily in an ordinary sewage system such as most cities and towns maintain and it has therefore been necessary to either haul the material away at great expense and dump it, or, as has usually been the practice, allow it to flow out into shallow open pits of large area where it remains and becomes an offense both to the eye and to the nose.

When the pulp is disposed of by exposure in these shallow beds it gives up its water to the surrounding soil and to the atmosphere very, very slowly, or a small portion of the water may slowly drain away, and the pulp undergoes a very slow decomposition.

Eventually the material may lose enough of its water and thus reach a high enough solids concentration that neighboring farmers may be persuaded to spend the time and energy necessary to dig into the partially decomposed, moist mass and haul it away to be spread upon their lands as fertilizer; thus at last freeing the manufacturer of his burden. This pulp or waste material contains pectous and other slimy substances which largely impart the undesirable characteristics to the material.

We have now discovered that this long and cumbersome method of disposal may be dispensed with entirely, and the whole material be taken care of quickly in a few simple and easy operations.

Briefly, in its specific aspects, our invention comprises coagulating the pectous and other slimy substances of the pulp by means of pectase. The pectase may be obtained from any suitable source and may be used in any suitable form. A dry pectase preparation may be used if desired. We find that clover or alfalfa is a very satisfactory source, and alfalfa meal is in a convenient form for use. Either dry or green alfalfa may be used. Instead of alfalfa, other leguminous plants containing pectase may be used.

When alfalfa meal is used it may be added dry, as an aqueous slurry, or an infusion may be made. In case dry meal is used a slightly greater amount of alfalfa meal may be needed. Dry alfalfa meal does not become active as readily, as the enzyme is more slowly dispersed and made available throughout the pulp. We find it convenient to make an infusion or extract of the alfalfa meal, and then add this infusion without separating out the fibrous part of the alfalfa.

A suitable extract of alfalfa meal may be made by mixing 40 parts by weight of alfalfa meal with 250 parts of water, and maintaining the mixture at about 40° C. for about 30 minutes, with continuous or occasional agitation.

It will be obvious that the enzymic activity of various materials will vary somewhat. Relative activity can be readily determined by adding a predetermined amount of the infusion, say 10 ml., to a predetermined amount of pectin, say 50 ml., of a 1% sol. and observing the time required for the mass to set to a jelly. Enzymic activity is then inversely proportional to setting time.

When a suitable proportion of enzymic material is added to the waste material containing pectous substances, under proper conditions of acidity and temperature, the mass will, after an interval of time, and if undisturbed, set into a comparatively weak or non-rigid gel.

This gel will synerese markedly. In practice we find it desirable to let the mix set until the gel is thoroughly formed. We then break up the gel by means of a suitable agitator, and pump the material onto inclined cylindrical screens, of sufficient fineness to retain substantially all of the fibrous material. About half the moisture present in the pulp will be quite readily removed by the screens. The screened material, or "screen cake", can then be readily handled either in a press or a centrifuge. Continuous machines are, of course, to be preferred in handling large amounts of material.

It is to be noted that the centrifuge presents, among others, this particular advantage, that it is much more effective in retaining the fine suspended solids than is an expressing press, since the fine solids will collect in the mat of material that forms in the centrifuge basket. It should be particularly pointed out that the liquids effluent from both the screening and the pressing or centrifuging operation are relatively very low in viscosity and sink readily and rapidly into ordinary filter beds and sewer beds; and their disposal therefore presents no particular problem.

While we have spoken above of letting the pulp-pectase mixture "set" to a gel, we would have it particularly understood that this procedure is not necessary and, under conditions of operation which make it desirable to do so, may be dispensed with entirely.

For example, we have found that, working at a dilution ratio which permitted mechanical agitation, our mixtures of pulp and alfalfa meal when stirred continuously for as little a time as 45 minutes have undergone a temporary increase in viscosity, which quickly receded. The mass then screened and pressed or centrifuged well, without ever having set to a firm coagulum.

The press cake or centrifuge cake, in all cases, although still fairly high in moisture, having sometimes as much as 75% water, will dry very readily, either by natural or by artificial means.

We particularly desire to call attention to the fact that it is a practical impossibility to press the untreated pulp, or to dewater it in any mechanical manner and it is very hard to dry. By our novel process it is very easily dewatered and very readily dried. In contradistinction to our process, the pulp liquor expressed from the waste material without preliminary treatment with an enzyme is extremely viscous and will not sink in filter beds.

At present we find it very satisfactory to follow the practice of using some added alkali or alkaline earth such as lime, or magnesium, with the pulp. Obviously, any suitable compound of these elements, which would have value in the final product, may be utilized. The amount to be used may vary somewhat. There are several other variants in our process and product. The more important of these are the dilution ratio, the amount of alfalfa meal or other pectase material employed, the pH of the mass to which the enzymic material is added, and the size of the particles of the pulp.

As an example of the amount of lime we use we may give the following: We take a batch of lemon pulp, which under present conditions of manufacture contains about 92% water and about 1% to 1.5% acid, calculated as citric, and determine the exact acidity. We then add the calculated amount of lime to reduce the acidity to below about 0.3%.

The acidity which we leave in the pulp will depend upon the use to which the final product is to be put. Where it is to be used as fertilizer the acidity may be neutralized completely. Under such conditions 2% of dry alfalfa meal, on the basis of the weight of the wet pulp above, will give excellent results. If a feed material is to be prepared, the acidity may suitably be adjusted to 0.1% or 0.2%, but normally to about 0.3%. A considerably more palatable product, and one having a much more pleasant odor, is produced at about 0.3% acidity. At this acidity 2% alfalfa meal will operate, but 4% gives a much superior result. Of course in all cases higher percentages of alfalfa meal or other suitable enzyme bearing material, or an infusion thereof, may be employed; the limiting factor in each instance being the correspondingly increased cost.

After the lime or other alkali or alkaline earth or magnesium has been added and thoroughly intermingled with the pulp, the mixture is preferably diluted. Liming after dilution seems to offer several advantages, particularly in that it avoids the mechanical difficulty of mixing the lime or equivalent compound into a viscous thick pulp. Liming before dilution, however seems, occasionally to give a result better in some respects.

The amount of diluent added will necessarily depend upon the concentration of the pulp as it leaves the plant processes. Working with the pulp mentioned above we find that we may suitably vary the dilution ratio from ¼ to 3 parts of diluent to 1 part of pulp. We believe at present that a ratio of about 1 to 2 parts of diluent to 1 part of pulp gives the best results, so far as being handled is concerned. This factor could readily be changed to suit changing conditions. It should be made clear that the amounts of lime and alfalfa used will depend upon the original pulp and will not vary appreciably with varying dilution ratios. Naturally, in processing materials already at or near the desired acidity the addition of lime or other similar material will not be necessary, since most natural products will already contain an abundance of alkaline earths or magnesium, or heavy metals, any of which are suitable to enable the pectase to coagulate the pectous substances.

We find it easier to mix in the pectase bearing material, such as alfalfa meal, after the material has been diluted. The mixing may be done in any suitable way, just so a fairly uniform distribution is effected. As stated above, alfalfa meal in the form of an infusion gives seemingly better, or at least quicker, results than dry.

After the enzymic material has been incorporated in the pulp, the mixture is preferably kept at a temperature of about 34° C. to 65° C. The most suitable range is about 45° C. to about 55° C. At such temperatures the activity of the enzyme seems to be greatest. When temperatures much below 34° C. are reached, the activity of the enzyme seems to be greatly retarded, and in such cases the mix must be warmed up again. At temperatures much above 65° C. the enzyme pectase seems to be permanently destroyed.

While being maintained at proper temperatures, as indicated, the mixture may either be agitated until it undergoes the increase and recession of viscosity referred to above, or it may be allowed to remain undisturbed until thoroughly set and then broken up with a suitable agitator.

We have made a series of pH determinations on samples of mixes, at the point in the process at which the enzymic material was added. We found that suitable results were obtained when the material was within the range of pH 4 to pH 7, as determined with a quinhydrone electrode. A pH of 3.5 or even slightly lower will give useful results in our process if the pectous materials and enzymes are present in amounts sufficient to give the desired coagulation within a reasonable time.

Mixes having pH values of 7.5 or higher also give a satisfactory coagulation and good dewatering and drying properties, but here there is a discoloration and a development of a peculiar odor, which we term an "overneutralized smell", which rather definitely precludes the use of the coagulum as a food product. At higher pH values attained by the use of lime there is a hardening of the pulp due, presumably, to a chemical formation of calcium pectate. In these cases the use of pectase is unnecessary.

The time required for the enzyme treatment will be dependent to some extent, upon the size of the particles of the pectous pulp. The choice of the desirable particle size will also be determined to some extent by the characteristics of the mechanical apparatus which is to handle the pulp. Our results seem to indicate that where the coagulum is to be pressed by a screw press, or other means, it is not desirable to grind the particles of pulp much finer than a diameter of about ⅛ inch. When filtration, or the like, is to be employed, the particles may be much finer, that is, in the neighborhood of 1/64 inch in diameter. The upper limit of particle size is determined by the time which can be allowed for the enzymic material to effect the required penetration of the pulp particles. We consider that, in working with citrus waste materials, satisfactory results may be obtained using materials having the particles as large as ¼ inch or ⅜ inch, or even larger in some instances.

We assume that the limiting factor is the availability of the pectous materials for action by the enzyme. It should be understood that in the matter of particle size, as discussed above, there is always present a quantity of finely divided suspended matter, which has not been considered in determining particle size; the sizes given being those of the majority of the larger particles of pulp.

When the reaction of the pectous material with the coagulating agent is relatively complete, that is, in the case under discussion, when the undisturbed pulp has thoroughly set, or has, during agitation undergone the increase and recession of viscosity described, it may then be dewatered in any satisfactory way. We do this mechanically by passing it through gently inclined, rotating cylindrical screens and then into either an expressing press or a centrifuge. We may then dry it, as by means of a rotary drier, or dispose of it in the wet state.

The mechanical effect of the added alfalfa or other fibrous pectase bearing material may be utilized to advantage in the separation of the free liquid from the treated waste pulp.

The liquid which is removed may be disposed of in a number of ways. We find it desirable to use a portion of it by having it re-enter the process as the diluent for the pulp, at the point where the pulp is diluted, between the step of liming, where lime is employed, and the step of incorporating the enzymic material.

This use of the waste liquor as diluent has a number of important advantages; among these may be mentioned the following: It saves the water that would otherwise be used for dilution and thus cheapens the process. It very considerably reduces the volume of the final waste effluent, and thus lessens the disposal problem. It reduces the amount of soluble solids and finely divided suspended solids lost in the final waste liquid effluent. This increases greatly the value of the product whether it be destined for feed, or for fertilizer, or for other purposes, since for these uses the finely divided solids and the soluble ones are frequently those of greatest value. It also conserves the enzymic principle, and thus can reduce to some extent the amount of alfalfa used per unit of fruit handled. Instead of actually reducing the amount of alfalfa used, we may avail ourselves of the increased firmness which is given by the conservation of the enzymic material by recirculation of the waste liquor. This increased efficacy is particularly notable when operating with alfalfa meal in the 2% range.

Obviously all the waste liquor cannot be recirculated, but only that amount needed to give the desired dilution. The balance may be treated for the recovery of soluble constituents contained therein, (as hereafter more fully discussed) or discarded or otherwise disposed of.

As we have noted, the waste liquors removed by mechanical dewatering contain some quantities of finely divided suspended solids. Since all of the liquor cannot be recirculated, we accomplish the desirable result of conserving the fine solids by running the waste liquor into a tank, or the like, large enough to permit the fine solids to settle out toward the bottom to some extent. We then pump out for recirculation in our process liquor drawn from the bottom of the tank, thus drawing back into the processing the fine solids, and, since a greater concentration of fine solids is thus achieved, relatively greater amounts of fine solids are retained with the fibrous part of the pulp, in the press cake and thus in the final product. The tank may be arranged to allow the clearer liquid to overflow at the top, or the top liquid may be drawn off by a pump. Suitable classifiers or thickeners operating on this principle are available. Naturally the top liquors will have about the same concentration of soluble solids as the bottom liquor.

We have found, particularly when working with lemon pulp, that the waste liquors effluent from our process may be made to serve as a source of valuable by-products, namely, calcium citrate and citric acid. As is well known, the juices of lemon are high in citric acid. As stated previously, the pulp on which we work may, in the case of lemon, contain in excess of 1% of citric acid.

Since we reduce this acidity by means of lime, or its equivalent in this respect, there will necessarily be considerable quantities of calcium citrate, or the like, formed in the material being handled. Since this salt is freely soluble at the concentrations at which it occurs here, a large part of it is removed in the waste liquor effluents. Where recirculation is resorted to, as described above, the concentration of the calcium citrate is built up somewhat, and its recovery is rendered more economical. As is well known, the calcium citrate is less soluble in hot water than in cold water and it may therefore be precipitated in large part by bringing the liquor near the boiling point, or vigorously boiling the liquor for a short time. The calcium citrate may then be removed by filtration and, if desired, may be converted to citric acid in the usual way. A complete description of the manufacture of citric acid may be found in "The manufacture of citric acid from lemons" by C. P. Wilson, J. Ind. Eng. Chem., vol. 13, No. 6, pp. 554–558, 1921.

We regard our new process as an important improvement in the art of producing citric acid from lemons, although the applicability of the process is not by any means limited to the processing of lemon wastes, or even of citrus wastes.

We also regard the product of our process as a new and useful material suitable for feed and/or fertilizer, and for other uses. The utility of the product will, it is true, be governed to some extent by the nature of the materials processed and by the amounts and kinds of ingredients added.

When citrus wastes are utilized the product is particularly valuable for feed and/or fertilizer. As we have pointed out previously, where the acidity of the pulp is not completely neutralized the final product has a greater palatability and a more pleasant odor. Products resulting from the use of either the 2% or the 4% of alfalfa meal are suitable for feed purposes. The 2% mixture will give, using pulp of about the concentration referred to above, a final product whose dry solids will be in the neighborhood of 20% alfalfa solids, while the 4% mix will give a final product whose dry solids are in the general neighborhood of 33% alfalfa solids. Since feeds of this type are usually fed in conjunction with alfalfa, the product having the higher alfalfa solids content might ordinarily be preferred for feeding purposes. Obviously those having lower alfalfa contents, being correspondingly cheaper to produce, would ordinarily be chosen for fertilizer purposes. It is to be understood that we do not intend to convey the impression that just 2% and 4% of alfalfa meal are the only useful amounts, since the amounts may be varied over a considerable range, as pointed out above.

In order that those skilled in the art may fully understand our invention, we give below an example, illustrating the application of our invention to the disposal of waste lemon pulp. Orange pulp may be treated in a very similar manner.

Example

One ton of hot lemon pulp is sampled and its acidity determined. The calculated amount of lime is added, in the form of a thin aqueous slurry to reduce the acidity to 0.3%. To the pulp is then added one to two tons of water (or waste liquor from a previous run) and the temperature of the whole mass brought to about 50° to 55° C., if not already near that range. To the pulp there is added, during thorough agitation, a mixture of about 80 lbs. of alfalfa meal with about 500 lbs. of water (or waste liquor from previous runs). The alfalfa and liquor should have been previously mixed and maintained at about 40° C., for about 30 minutes, being agitated occasionally.

The mixture is then allowed to remain undisturbed. In from 15 minutes to an hour or more a marked gellification will have taken place. We find it convenient, because of seemingly improved pressing qualities, to let the pulp remain undisturbed at this point for some convenient period, such as an hour or more. The gel is then broken up by means of an agitator and pumped over screens of the type described. Here about half the liquid will be removed. This may be run into the settling tank. The screened material is then mechanically dewatered, the effluent being passed into the settling tank. The resultant press or centrifuge cake will have about 70% to 75% water. It is a firm, handleable cake, and may be used as a feed in this condition, especially after shredding. If desired it may first be dried, after which it is an excellent feed material.

The example given describes a preparation of feed material. With suitable variations in the process an excellent fertilizer material may be prepared, or material suitable for other purposes.

Those skilled in the art will, from the hereinabove description, clearly understand the nature, purpose and uses of this invention. Although the invention has been described in great detail, particularly as it relates to the treatment of citrus wastes containing slimy substances, it is to be understood the invention is not limited to the treatment of such wastes alone, but is also applicable to any organic industrial waste containing pectous and/or other slimy substances which render the disposal of such wastes difficult. All such changes and modifications as come within the scope of the appended claims are, therefore, embraced thereby.

We claim:

1. In a method of treating organic industrial wastes containing slimy components, the steps of adjusting the acidity of an organic industrial waste containing slimy components to within a range permitting the activity of a pectase, adding a pectase to such prepared waste, maintaining the waste and enzyme at a temperature adapted to facilitate the action of the enzyme on such slimy components, and finally dewatering the treated waste to separate liquid constituents therefrom.

2. In a method of recovering values from organic industrial wastes containing pectous and slimy substances, the steps of adjusting the acidity of an industrial waste containing pectous and slimy components to within a range permitting the activity of a pectase, adding a pectase to such prepared waste, allowing the reaction between the enzyme and pectous and slimy components to proceed substantially to completion, and finally dewatering the treated waste to separate liquid constituents therefrom.

3. In a method of recovering values from citrus wastes, the steps of adjusting the acidity of citrus waste containing pectous and slimy substances to between zero and 0.3% acidity by adding an alkaline substance to such citrus waste, and diluting the waste whereby a medium of acidity permitting the activity of a pectase is produced, adding a pectase to such prepared citrus waste, and finally dewatering the treated waste to separate liquid constituents therefrom.

4. In a method of recovering values from citrus wastes containing pectous and slimy components, the steps of adjusting the acidity of citrus wastes containing pectous and slimy components to within a range permitting the activity of pectase, coagulating the pectous and slimy components of the waste by means of pectase, and dewatering the treated waste to separate liquid constituents therefrom.

5. In a method of recovering values from citrus wastes containing pectous and slimy components, the steps of adjusting the acidity of citrus wastes containing pectous and slimy components to within a range permitting the activity of pectase, coagulating the pectous and slimy components of the waste by adding pectase thereto, separating an impure solution containing calcium citrate from the waste, and precipitating the calcium citrate from the impure solution.

6. In a method of recovering values from citrus wastes containing pectous and slimy substances, the steps of adjusting the acidity of a citrus waste containing pectous and slimy substances to between about zero and 0.3% acidity, whereby a medium of acidity permitting the activity of pectase is produced, coagulating the pectous and slimy components of the waste by means of pectase, separating an impure solution containing calcium citrate from the waste, and precipitating the calcium citrate from said impure solution by heating.

7. In a method of recovering values from citrus wastes, the steps of adding lime to and diluting the waste whereby its acidity is adjusted to lie within a pH range permitting the activity of pectase, adding a small amount of alfalfa meal to the waste, and finally dewatering the treated waste to separate liquid constituents therefrom.

8. In a method of recovering values from citrus wastes, the steps of adding lime to and diluting the waste whereby its acidity is adjusted to lie between about zero and 0.3%, adding a small amount of alfalfa meal in the form of an infusion, and mechanically dewatering the mass.

9. In a method of recovering values from citrus wastes containing pectous and slimy substances, the steps of adding an alkaline substance to the waste to neutralize the major portion of acid contained therein, diluting the waste, coagulating pectous and slimy substances contained in the waste by adding a pectase, separating an impure solution containing calcium citrate from the waste, recirculating part of the solution as diluent for subsequent batches of waste, whereby the concentration of calcium citrate is increased, and precipitating calcium citrate from remaining portions of the impure solution.

10. In a method of recovering values from waste lemon pulp containing pectous and slimy components, the steps of neutralizing major portions of acid contained in the waste by adding an alkaline substance thereto, diluting the pulp, coagulating the pectous and slimy components of the pulp by means of a pectase, separating from the pulp liquid containing finely divided suspended solids and substances in solution, and recirculating as diluent for subsequent batches of pulp portions of the separated liquid, whereby the major portion of the suspended solids and part of the dissolved solids are added to subsequent batches of pulp and their concentration therein thereby increased.

11. In the treatment of industrial wastes containing pectous substances, the steps of treating organic wastes containing pectous substances with ground material from leguminous plants, whereby the pectous substances in the waste are coagulated, and subsequently dewatering the mass.

12. In the treatment of industrial wastes containing pectous substances, the steps of treating an organic waste containing pectous substances with a compound of the group consisting of alkaline earth metal and magnesium to reduce the acidity to between about 0.00 and 0.3%, then treating the material with pectase and subsequently dewatering the treated waste.

13. A material suitable for feed or fertilizer comprising a major proportion of citrus pulp solids and a minor proportion of alfalfa solids, the slimy constituents of the citrus pulp being in coagulated form.

14. A new fertilizer material comprising substantially neutral waste citrus pulp solids having the slimy constituents thereof in coagulated form.

15. A material suitable for feed, whose solids are approximately 60 to 80% citrus pulp solids having the slimy constituents thereof in coagulated form, and approximately 20 to 40% alfalfa solids.

16. A new material suitable for feed or fertilizer, comprising waste citrus pulp solids having the slimy constituents thereof in coagulated form.

17. In a method of recovering values from citrus wastes containing pectous and slimy substances, the steps of adding an alkaline substance to the waste to neutralize acid contained therein, coagulating the pectous and slimy substances contained in the waste with a pectase, and removing aqueous material from the waste.

18. In the treatment of citrus pulps, the steps of treating citrus pulp with ground material from leguminous plants, whereby the pectous substances in the citrus pulp are coagulated, and subsequently dewatering the mass.

19. In the treatment of citrus pulp containing pectous substances, the steps of treating citrus pulp containing pectous substances with a pectase whereby the pectous substances in the pulp are coagulated, and subsequently dewatering the mass.

20. In a method of recovering values from citrus wastes containing pectous and slimy substances, the steps of adding an alkaline substance to the waste to neutralize the major portion of acid contained therein, coagulating the pectous and slimy substances contained in the waste by treatment with pectase, separating an impure solution containing calcium citrate from the waste, recirculating part of the solution as diluent for subsequent batches of waste whereby the concentration of calcium citrate is increased, and precipitating calcium citrate from remaining portions of the impure solution.

21. In a method of recovering values from waste lemon pulp containing pectous and slimy components, the steps of neutralizing major portions of acid contained in the waste by adding an alkaline substance thereto, diluting the pulp, coagulating the pectous and slimy components of the pulp by treating the same with pectase-containing material, separating from the pulp liquid containing finely divided suspended solids and substances in solution, and recirculating as diluent for subsequent batches of pulp portions of the separated liquid whereby the major portion of the suspended solids and part of the dissolved solids are added to subsequent batches of pulp and their concentration therein thereby increased.

22. A new fertilizer material comprising non-acid waste citrus pulp solids having the slimy constituents thereof in coagulated form.

23. A material suitable for feed or fertilizer comprising citrus pulp and solids derived from leguminous plants, the slimy constituents of the citrus pulp being in coagulated form.

GORDON MANLEY COLE.
HOWARD W. HALL.